(12) United States Patent
Nitta

(10) Patent No.: US 6,321,150 B1
(45) Date of Patent: Nov. 20, 2001

(54) ABNORMALITY MONITORING DEVICE FOR A VEHICLE CONTROL SYSTEM

(75) Inventor: Tomoaki Nitta, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/441,908

(22) Filed: Nov. 17, 1999

(30) Foreign Application Priority Data

Nov. 18, 1998 (JP) .................................................. 10-328638

(51) Int. Cl.$^7$ ...................................................... G06F 19/00
(52) U.S. Cl. ................................ 701/29; 701/33; 701/48; 340/825.16
(58) Field of Search ................................ 701/29, 33, 48; 340/825.16, 825.5; 370/451

(56) References Cited

U.S. PATENT DOCUMENTS

| | | | |
|---|---|---|---|
| 4,945,486 | * 7/1990 | Nitschke et al. | 701/48 |
| 5,077,670 | * 12/1991 | Takai et al. | 701/33 |
| 5,132,905 | * 7/1992 | Takai et al. | 701/33 |
| 5,189,617 | * 2/1993 | Shiraishi | 701/48 |
| 5,369,584 | * 11/1994 | Kajiwara | 701/48 |
| 5,586,118 | 12/1996 | Hashimoto et al. | 370/451 |
| 5,835,873 | * 11/1998 | Darby et al. | 701/48 |
| 5,896,418 | * 4/1999 | Hamano et al. | 701/33 |
| 5,938,708 | * 8/1999 | Wallace et al. | 701/48 |
| 5,974,351 | * 10/1999 | Croft et al. | 701/48 |
| 6,012,004 | * 1/2000 | Sugano et al. | 701/33 |

FOREIGN PATENT DOCUMENTS 0449304  10/1991  (EP).
0793156   9/1997  (EP).

* cited by examiner

Primary Examiner—Gary Chin
(74) Attorney, Agent, or Firm—Martin A. Farber

(57) ABSTRACT

A data field of a data frame which is sent from a HEV_ECU to a motor A controller and a motor B controller includes control data of 5 bytes and a number-of-sending-times counter of one byte, which is located following the control data. The contents of the number-of-sending-times counter is incremented (decremented) every time data is sent to the motor A controller and the motor B controller. A T/M_ECU constantly monitors the contents of the number-of-sending-times counter. When a count value of the number-of-sending-times counter is not normally incremented (decremented) consecutively two times, the T/M_ECU decides that the HEV_ECU is abnormal, and informs other ECUs that the HEV_ECU is abnormal.

12 Claims, 2 Drawing Sheets

ABNORMALITY MONITORING DEVICE FOR A VEHICLE CONTROL SYSTEM

BACKGROUND OF THE INVENTION

1. Field of the Invention

The present invention relates to an abnormality monitoring device for a vehicle control system formed by interconnecting a plurality of control units of which objects to be controlled are different from one another by multiplex communication lines.

2. Description of the Related Art

In a vehicle control system employed in various vehicles, including motor vehicles, various controls of an engine, a transmission, suspensions, an air conditioner and the like are respectively assigned to a plurality of electronic control units (ECUs) including microcomputers and others, which are mounted on the vehicle. The ECUs are interconnected by communication lines, and control data transmission is performed among the ECUs, to thereby improve its total control performance.

In such a vehicle control system, it is important that each ECU carries out a self-diagnosis for its peripheral system, and additionally that the vehicle control system performs the monitoring operation to detect an abnormality in the overall control system. Conventionally, each of those ECUs mutually monitors an abnormality or abnormalities of the remaining ECUs by use of watchdog timers or by echo backing communication data.

Recently, in the vehicle, the amount of data transmitted between those ECUs increases. The data amount increase creates many problems, such as wire harness increase in size, wire layout restriction, and vehicle weight increase. To cope with those problems, there is a trend of adopting the multiplex communication technique for the communications among the ECUs. However, addition of the hardware for monitoring the abnormality, such as watchdog timer wires goes against the trend, and further increases the system cost.

The abnormality monitoring by the data echo-backing has also problems. It takes a long processing time. A traffic of the transmission path increases. As a result, the throughput of the overall system reduces.

SUMMARY OF THE INVENTION

Accordingly, an object of the present invention is to provide an abnormality monitoring device for a vehicle control system in which when an abnormality occurs in one control unit, another control unit accurately detects the abnormality without any additional hardware specially designed for abnormality monitoring and any additional complex process.

To achieve the above object, the present invention provides a first abnormality monitoring device for a vehicle control system formed by interconnecting a plurality of control units of which objects to be controlled are different from one another by multiplex communication lines, the improvement being characterized in that one specific control unit in the vehicle control system includes means for inserting a count value indicative of the number of sending times, which is independent of control data, into communication data, and for sending the resultant communication data, and a single other control unit of the vehicle control system includes judging means which monitors the count value of the communication data transmitted from the specific control unit, and decides that the specific control unit is abnormal, when the count value is not consecutively updated.

The invention also provides a second abnormality monitoring device for a vehicle control system formed by interconnecting a plurality of control units of which objects to be controlled are different from one another by multiplex communication lines, the improvement being characterized in that a first control unit in the vehicle control system includes means for inserting a count value indicative of the number of sending times, which is independent of control data, into communication data, and for sending the resultant communication data to a second control unit in the vehicle control system, and a third control unit of the vehicle control system includes judging means which monitors the count value of the communication data transmitted from the first control unit to the second control unit, and decides that the first control is abnormal, when the count value is not consecutively updated.

In the first abnormality monitoring device, when the specific control unit in the vehicle control system sends data, it inserts a count value indicative of the number of sending times, which is independent of control data, into the data, and then sends the resultant data. Another control unit monitors the count value. When the count value is not consecutively updated, it is judged that the specific control unit is abnormal.

In the second abnormality monitoring device, when data is sent from the first control unit to the second control unit, it inserts a count value indicative of the number of sending times, which is independent of control data, into the data, and sends the resultant data to the second control unit. The third control unit monitors the count value. When the count value is not consecutively updated, it is judged that the first control unit is abnormal.

DETAILED DESCRIPTION OF THE PREFERRED EMBODIMENTS

Figure 1:
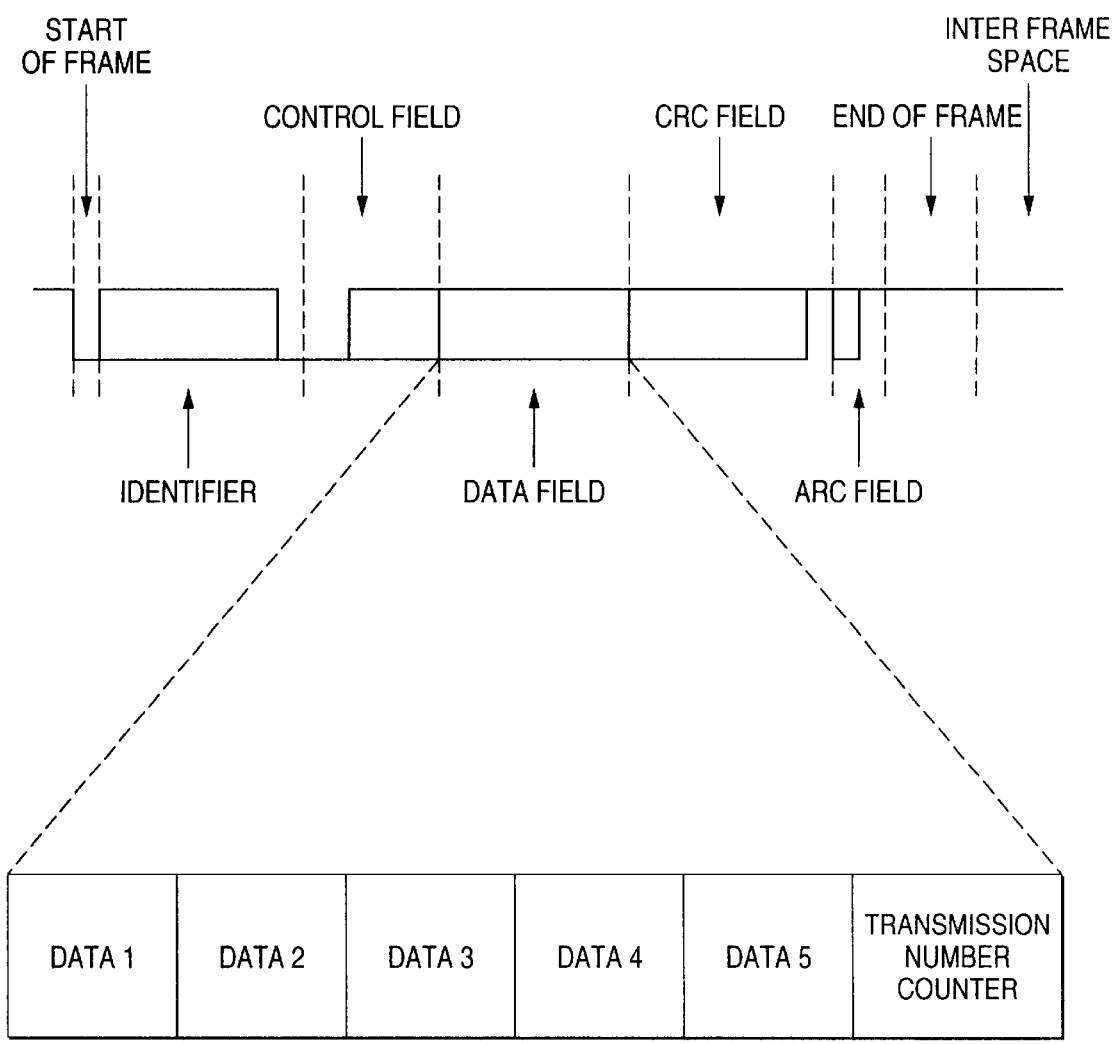
FIG. 1 is a diagram showing a format of a data frame.
Figure 2:
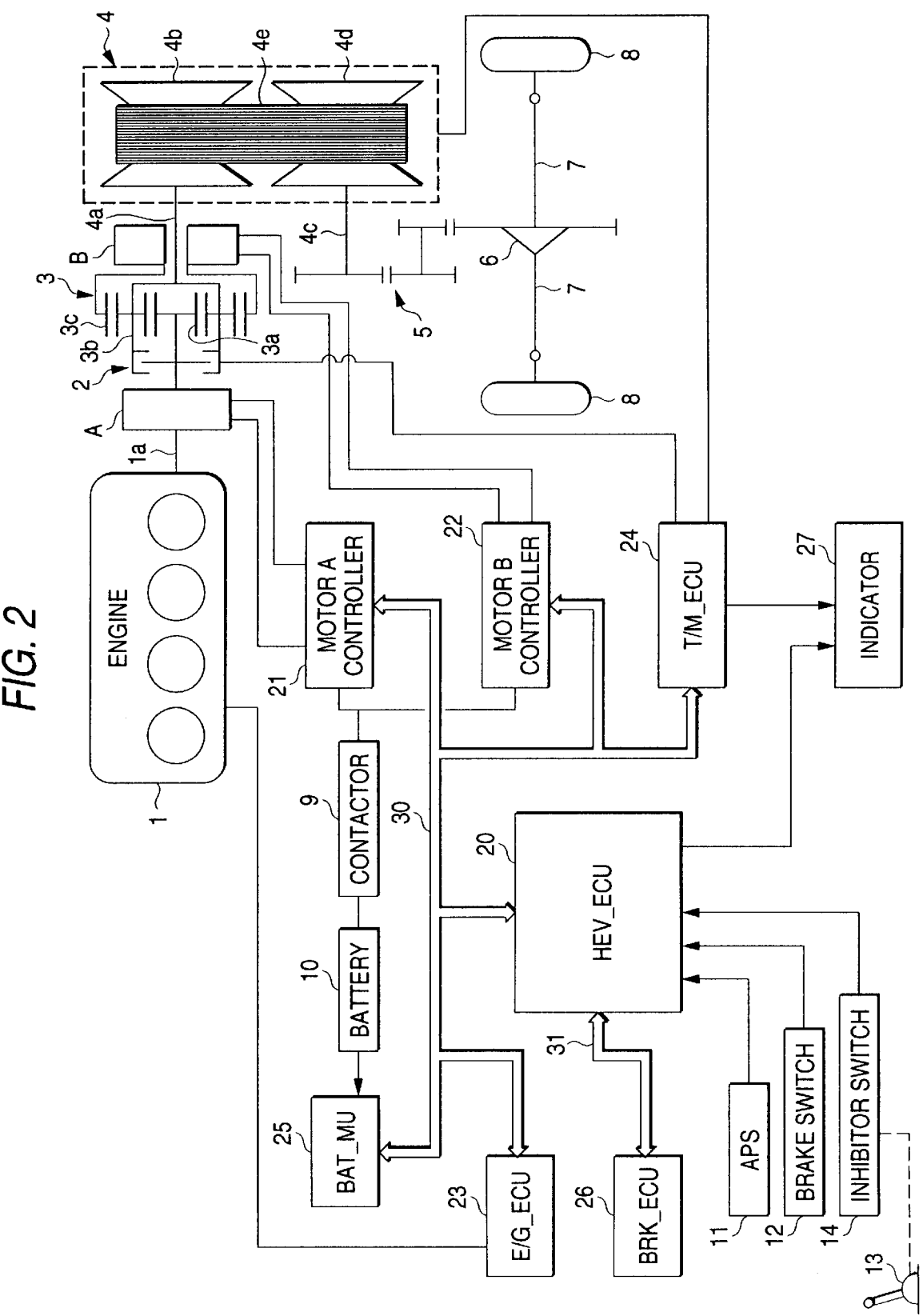
FIG. 2 is a block diagram showing a control system for a hybrid vehicle in which control units are interconnected into a network of a multiplex communication system.

An abnormality monitoring device for a vehicle control system, which is the preferred embodiment of the present invention, will be described with reference to the accompanying drawings. FIGS. 1 and 2 show diagrams useful in explaining the preferred embodiment. Specifically, FIG. 1 is an explanatory diagram showing a format of a data frame, which is handled in the vehicle control system. FIG. 2 is a block diagram showing a control system for a hybrid vehicle in which control units are interconnected into a network of a multiplex communication system.

FIG. 2 shows a control system for a hybrid car (referred to as a hybrid-vehicle control system) which uses a combination of an engine and electric motors, which the hybrid-vehicle control system is a specific example of a vehicle control system in which a plurality of control units having different controlled objects are interconnected by multiplex communication lines. The illustrated hybrid-vehicle control system is formed by incorporating seven electronic control units (ECUs) into a multiplex communication system.

In the present embodiment, the hybrid car or vehicle is provided with a drive system, which includes, as basic components, an engine 1, an electric motor A, a planetary gear unit 3, an electric motor B, and a power converting mechanism 4. The electric motor A is used for starting up the engine 1, generating an electric power and assisting the engine in driving the car. The planetary gear unit 3 is coupled to an output shaft 1a of the engine 1 through the electric motor A. The electric motor B controls the function of the planetary gear unit 3, serves as a drive source when the car starts to run and moves rearward, and collects deceleration energy. The power converting mechanism 4 performs the speed changing and torque amplifying operations when the car runs, thereby to effect a power conversion.

The planetary gear unit 3 is a planetary gear of the single pinion type which includes a sun gear 3a, a carrier 3b which rotatably supports a pinion being in mesh with the sun gear 3a, and a ring gear 3c in mesh with the pinion. Further, there is juxtaposedly provided a lock-up clutch 2 for coupling the sun gear 3a with the carrier 3b and decoupling the former from the latter.

The power converting mechanism 4 may be a transmission including a combination of gear trains or a transmission using a hydraulic torque converter. It is preferable to use a belt type CVT(continuous variable transmission) for the power converting mechanism 4. The belt type CVT includes a primary pulley 4b supported with an input shaft 4a, a secondary pulley 4d supported with an output shaft 4c, and a drive belt 4e wound around the primary pulley 4b and the secondary pulley 4d. In the description to follow, the power converting mechanism 4 will be described in the form of the CVT 4.

Specifically, in the drive system of the hybrid car to which the invention is incorporated, the planetary gear unit 3 in which the lock-up clutch 2 is located between the sun gear 3a and the carrier 3b is disposed between the output shaft 1a of the engine 1 and the input shaft 4a of the CVT 4. The sun gear 3a of the planetary gear unit 3 is coupled with the output shaft la of the engine 1 while the electric motor A is inserted therebetween. Th ring gear 3c is coupled with the electric motor B. A differential mechanism 6 is coupled to an output shaft 4c of the CVT 4 while a reduction gear train 5 is inserted therebetween. The differential mechanism 6 is coupled to a drive shaft 7, which is then coupled to a fore or rear drive wheel 8.

In this case, as described above, the engine 1 and the electric motor A are coupled to the sun gear 3a of the planetary gear unit 3. The electric motor B is coupled to the ring gear 3c of the planetary gear unit 3. With this mechanism, an output power is output from the carrier 3b. The output power from the carrier 3b is applied to the CVT 4. In turn, the CVT performs a speed changing operation and a torque amplifying operation, and transmits the resultant power to the drive wheel 8. Therefore, both the electric motors A and B may be used for both the electric power generation and the supplying of the drive force. Therefore, relatively small power electric motors may be used for those motors A and B.

The sun gear 3a and the carrier 3b of the planetary gear unit 3 are coupled by the lock-up clutch 2 in accordance with the running condition. As a result, a drive shaft directly coupled to the engine is formed which ranges from the engine 1 to the CVT 4, and includes the motors A and B being disposed between them. With formation of the drive shaft of the directly-coupled type, a drive force is efficiently transmitted from the engine to the CVT 4 or a braking force coming from the drive wheel 8 can be utilized.

The torque transmission by the engine 1 and the electric motors A and B, which is performed through the planetary gear unit 3, when the coupling and decoupling operations of the lock-up clutch 2 are performed, and current flows resulting from the electric power generation by those motors A and B when the lock-up clutch 2 is so operated, are described in detail in Japanese Patent Unexamined Publication No. 11-198668, filed by the Applicant of the present patent application.

In the hybrid-vehicle control system for controlling the hybrid car, a first multiplex communication line 30 connects a hybrid ECU (HEV_ECU) 20 for controlling the overall control system to a motor A controller 21 for controlling the electric motor A, a motor B controller 22 for controlling the electric motor B, an engine ECU (E/G_ECU) 23 for driving and controlling the engine 1, a transmission ECU (T/M_ECU 24) for controlling the lock-up clutch 2 and the CVT 4, and a battery management unit (BAT_MU) 25 for managing an electric power of a battery 10. A second multiplex communication line 31 connects the HEV-ECU 20 to a brake ECU (BRK_ECU) 26 for performing a brake control.

The HEV_ECU 20, which controls the overall hybrid-vehicle control system, is further connected to various sensors and switches for detecting drive operations by a driver. Examples of those sensors and switches are an acceleration pedal sensor (APS) 11 for sensing an amount of depression of an acceleration pedal (not shown), a brake switch 12 which is turned on when a brake pedal (not shown) is depressed, and an inhibitor switch 14 which is turned on when an operation lever of a selector mechanism 13 is positioned to a P-range or an N-range, and is turned off when it is positioned to a D-range or an R-range.

The HEV_ECU 20 receives signals from those sensors and switches and data from the ECUs, computes a necessary car drive torque by using the signals and the data to thereby determine torque values distributed to the drive systems, and sends control commands to the ECUs by the multiplex communication.

Furthermore, the HEV_ECU 20 is connected to various meters for indicating vehicle operating states, which are car speed, engine speed, battery charging state and an indicator 27 such as a warning lamp, for warning an abnormality to the driver if it occurs. The indicator 27 is also connected to the T/M_ECU 24. When the HEV_ECU 20 is abnormal, the T/M_ECU 24 carries out an abnormality control, in place of the HEV-ECU 20 being now abnormal, and causes the indicator 27 to indicate the abnormality.

The motor A controller 21, which includes an inverter for driving the electric motor A, basically performs a constant rotating speed control of the electric motor A according to servo ON/OFF commands and a motor speed command, which are transmitted from the HEV_ECU 20 by the multiplex communication. The motor A controller 21 feeds back to the HEV_ECU 20 a torque and motor speed (revolution number) of the electric motor A, current values and others, and further sends a torque limitation request, voltage value and others to the HEV_ECU 20.

The motor B controller 22, which includes an inverter for driving the electric motor B, basically performs a constant torque control of the electric motor B according to servo ON/OFF (including forward and reverse rotations) commands and a torque command (power running, regeneration) command, which are transmitted from the HEV_ECU 20 by the multiplex communication. The motor B controller 22 feeds back to the HEV_ECU 20 a torque and a motor speed (revolution number) of the electric motor B, current values and others, and sends data representative of a voltage value and others to the HEV-ECU 20.

The E/G_ECU 23 basically performs a torque control of the engine 1. The E/G_ECU 23 controls an amount of fuel injected by the injector (not shown), a throttle opening by an ETC (electrically driven throttle valve), power correction learning of auxiliary equipment, e.g., A/C (air conditioner), fuel cutting and the like. The control of those items by the E/G_ECU 23 is carried out in accordance with various information transmitted from the HEV-ECU 20 by the multiplex communication. Examples of those pieces of information are control commands (positive and negative torque commands, fuel cut command, air conditioner ON/OFF permission commands, and others). Further examples of the information are actual torque feedback data, vehicle speed, gear select positions (P, N ranges, etc.) by the inhibitor switch 14, full-throttle data and closed-throttle data represented by signals from the APS 11, ON/OFF states of the brake switch 12, and brake operating conditions (including ABS).

The E/G_ECU 23 also feeds back to the HEV_ECU 20 various data pieces, such as a control torque value of the engine 1, fuel cutting execution, execution of full-throttle increment correction for the fuel injection quantity, ON/OFF states of the air conditioner, throttle valve full closing data by an idle switch (not shown). Further, the E/G_ECU 23 sends a warming-up request for the engine 1 to the HEV_ECU 20.

The T/M_ECU 24 controls the coupling and decoupling operations of the lock-up clutch 2, and a gear ratio of the CVT 4 in accordance with the following various information received from the HEV_ECU 20 by the multiplex communication. Examples of the information are control commands, such as a target number of revolutions of the primary pulley, CVT input torque instruction, lock-up request and others. Further examples are engine speed, accelerator opening, gear select position by the inhibitor switch 14, ON/OFF states of the brake switch 12, air conditioner on/off permission, brake operating status (including ABS), throttle valve full closing data of the engine 1, and others.

The T/M_ECU 24 feeds back to the HEV_ECU 20 various information items, such as vehicle speed, input limitation torque, the number of revolutions of the primary and secondary pulleys of the CVT 4, lock-up completion, gear status information corresponding to the inhibitor switch 14. Further, the T/M_ECU 24 sends an engine speed-up request for increasing a quantity of the CVT 4, a low-temperature start-up request, and others to the HEV-ECU 20.

The BAT_MU 25, which is a called power management unit, carries out various controls for the management of the battery 10, such as charging/discharging control of the battery 10, fan control, and external charging control. Further, the BAT_MU 25 sends, by the multiplex communication, to the HEV_ECU 20 various data items representative of a residual capacity of the battery 10, voltage and current restriction data and others, and data indicating that the battery is under external charging. To externally charge the battery, a contact 9 is turned to disconnect the motor A controller 21 and the motor B controller 22 from the battery 10.

The BRK_ECU 26 computes a necessary braking force in accordance with information, such as regenerative quantity and regeneration torque feedback, which are transmitted from the HEV_ECU 20 by the multiplex communication, and controls a hydraulic pressure in a braking system on the basis of the computing result. Further, it feeds back to the HEV-ECU 20 a regeneration quantity command (torque command), vehicle speed, hydraulic pressure, braking status of the brake (including ABS), and others.

The hybrid-vehicle control system mentioned above monitors an abnormality in the control system by use of the multiplex communication system. When an abnormality occurs in the drive system or the control system and as a result, the vehicle running is impossible, the hybrid-vehicle control system stops the vehicle safely. When the abnormality is present but the vehicle may run, the hybrid-vehicle control system limits the output power of the drive system, and secures the least running capability of the vehicle.

The abnormality monitoring by the multiplex communication is mainly carried out such that the HEV_ECU 20, which supervises the overall control system, manages the self-diagnosis results obtained by the ECUs in a centralizing manner. As the self-diagnosis mode of each ECU, in addition to the diagnosis of the ECU per se by the watchdog timer, there are included the diagnosis of wire disconnection and short-circuiting detected through the monitoring of the output values of the sensors, the check of the conformity between the control data and the sensor output values, and the diagnosis of disconnection and short-circuiting in the actuator system by use of voltage applied to the actuator or an output current value thereof.

When the motor A controller 21 operates in the self-diagnosis mode, it detects an abnormality of the control system for the electric motor A by use of a watchdog timer installed thereto. In this mode, it further detects an abnormality in the electric motor A and its associated sensor system by utilizing a motor-A drive current detected. The same thing is correspondingly applied to the self-diagnosis of the electric motor B.

When the E/G_ECU 23 operates in the self-diagnosis mode, its detects an abnormality of the engine control system per se by use of the watchdog timer installed thereto. In this mode, it further can detect an abnormality in the sensor system and the actuator system. The detection is made on the basis of the conformity between a control value of the ETC and an actual throttle opening detected by the related sensor, and the conformity between an engine control value based on the accelerator opening data by the APS 11, which is received from the HEV-ECU 20, and an actual throttle opening and an actual engine speed.

When the T/M_ECU 24 operates in the self-diagnosis mode, it is capable of detecting an abnormality of the gear control system per se by use of the watchdog timer installed thereto. Further, in this mode, it is capable of detecting an abnormality of the gear ratio control valve and an abnormality of the sensor for sensing the number of revolution. The abnormality detection is based on the conformity between an actual gear ratio and a gear ratio control value of the CVT 4. The actual gear ratio is computed by use of an output value of the sensor for detecting the number of revolutions of the primary pulley 4b and an output value of the sensor for sensing the number of revolutions of the secondary pulley 4d.

When the BAT_MU 25 operates in the self-diagnosis mode, it detects an abnormality of the battery management system by use of the watchdog timer contained therein. In this mode, it can further detect an abnormality of the battery 10 and the contact 9 by use of an output value of the sensor for detecting a voltage of the battery 10 and an output value of the sensor for sensing an output current of the battery 10.

When the BRK_ECU 26 operates in the self-diagnosing mode, it detects an abnormality of the brake control system per se by use of the watchdog timer contained therein. In this mode, it can further detect an abnormality of the hydraulic control valve and the brake actuator by use of an output value of the sensor for sensing a hydraulic pressure of the brake system and an output signal of the sensors for sensing wheel speeds of road wheels.

When each ECU detects an abnormality by its self-diagnosis function, and the HEV-ECU 20 receives its abnormality by the multiplex communication, when a periodic communication of it with a given ECU is not carried out, or when a control command sent from the HEV_ECU 20 to each ECU by the multiplex communication matches with the control data fed back from each ECU, the HEV_ECU 20 decides that that ECU is abnormal, and sends a faulty-ECU presence message to the remaining ECUs, and restricts the operations of the ECUs and drives the indicator 27 to inform the driver of the faulty occurrence, when any of the cases takes place.

A communication network adaptable for high speed communications is preferable for the multiplex communication system interconnecting the ECUs. In the present embodiment, the CAN (Controller Area Network) as one of the ISO standard protocols is employed for the vehicle communication network.

As well known, the CAN message protocol contains four frames; a data frame for transmission data, a remote frame for a transmission request, an error frame for error detection, and an overload frame output when a receiving side is not ready for reception. In the present embodiment, the HEV_ECU 20 sends, by use of the remote frame, a self-diagnosis result request to the ECUs at the time of starting the control system or at the time of the periodic diagnosis. The data frame is used when the HEV_ECU 20 sends control commands to the ECUs, and when the ECUs send control data, e.g., feedback data, to the HEV-ECU 20 at fixed time intervals. Further, when each ECU executes its self-diagnosis to detects an abnormality or the HEV_ECU 20 detects an abnormality, the data frame is used for sending the detected abnormality at random time periods.

FIG. 1 shows a format of the data frame. As shown, an arbitration frame follows a start of frame for communication start. The arbitration frame stores an identifier for determining a priority order of a message and for identifying the destination and the contents of the message. A data field follows a control field used for control. The data field stores a control command, control data, or data for giving information of an abnormality/warning. The data frame is followed by a CRC field for transmission error check, and an end of frame showing the end of a message. An interframe space indicating a time space between the adjacent messages is present between the end of frame of the present data frame and a start of frame of the subsequent data frame.

In the communication by use of the second multiplex communication line provided exclusively for interconnecting the HEV_ECU 20 and the BRK_ECU 26, the identifier is omitted to simplify the processing and to achieve high speed communications.

The data field is a variable length field of "n" bytes long (n=0 to 8: n=0 for the remote frame). In the communication on the control data between the HEV_ECU 20 and each ECU, one or two bytes are allotted to each of control items, such as voltage, engine speed, and throttle opening, in the data field of n=1 to 8. Individual bits of one byte are allotted to ON and OFF states of the switch, gear range positions, and servo ON and OFF commands in such a way that each bit of one byte is allocated to one control item.

The data for notifying an abnormality/warning is allocated to the data field of one byte. The bits 0 to 6 of one byte are allotted to an error number indicative of error contents.

The bit 7 is allocated to an error flag indicative of error occurrence. The error flag is set to "1" when an error occurs, and is reset to "0" in a normal mode or a warning mode. The error number is "000000" in the normal mode.

In the data frame, which is sent at fixed time intervals from the HEV_ECU 20 for the purpose of the system control, a counter for counting the number of sending times, which is independent of the control data, is inserted into an idle area of 8 bytes of the data field. The ECUs other than the HEV_ECU 20 monitor the count value of the counter, and detect an abnormality of the HEV_ECU 20 through their monitoring.

In the present embodiment, each of the data frames (of which the identifiers are common), which are transmitted from the HEV_ECU 20 to the motor A controller 21 and the motor B controller 22, is constructed with a data field containing control data of 5 bytes and a number-of-sending-times counter of 1 byte, which follows the control data.

Specifically, each data frame that is transmitted from the HEV_ECU 20 to the motor A controller 21 and the motor B controller 22 contains a data field of 6 bytes, DATA1 to DATA6, as shown in FIG. 1. The DATA1 is the upper 1 byte of a motor-A speed (revolution number) command; the DATA2 is the lower 1 byte of the motor-A speed command; DATA3 is the upper 1 byte of a motor-B torque command; DATA4 is the lower 1 byte of the motor-B torque command; DATA5 contains a motor-A servo ON command of 1bit, a motor-A torque 0 command of 1 bit, and a motor-B servo ON command of 1 bit; and the DATA6 is a number-of-sending-times counter.

Every time the HEV_ECU 20 sends a message to the motor A controller 21 and the motor B controller 22, the number-of-sending-times counter of the data field is incremented (or decremented) in its count value from an initial value (for example, "0"). The number-of-sending-times counter is monitored by the motor A controller 21 or the motor B controller 22, or other ECUs in the receiving side.

In the hybrid-vehicle control system of the embodiment, when an abnormality occurs in the HEV_ECU 20, the T/M_ECU 24 carries out an abnormality process in place of the HEV_ECU 20. Therefore, the number-of-sending-times counter in the data frame, which is sent from the HEV_ECU20 to the motor A controller 21 and the motor B controller 22, is always monitored by the T/M_ECU 24. When a count value of the number-of-sending-times counter is not normally incremented (decremented) consecutively two times, the T/M_ECU 24 decides that the HEV_ECU 20 is abnormal, and informs other ECUs that the HEV_ECU 20 is abnormal.

Thus, the ECUs other than the HEV_ECU 20 can detect an abnormality that the self-diagnosis of the HEV_ECU 20 per se fails to detect and the watchdog timer cannot fail to detect through its monitoring operation. Further, since the number-of-sending-times counter is inserted into each data frame periodically transmitted from the HEV_ECU 20, the abnormality can be detected through a simple process without increasing a traffic on the transmission line.

Since the number-of-sending-times counter is inserted into the data frame to be transmitted from each ECU, an inexpensive mutual monitoring is realized without additionally using hardware specially designed for abnormality monitoring, for example, increasing the number of watchdog timer lines.

As seen from the foregoing description, in the abnormality monitoring device of the present invention, a control unit in a vehicle control system inserts a count value indicative of the number of sending times, which is independent of control data, into data, and sends the resultant data to a second control unit. The second control unit monitors the count value. When the count value is not consecutively updated, it is judged that the specific control unit is abnormal. Therefore, when an abnormality occurs in one control unit, another control unit accurately detects the abnormality without any additional hardware specially designed for abnormality monitoring and any additional complex process.

While only certain embodiments of the invention have been specifically described herein, it will apparent that numerous modifications may be made thereto without departing from the spirit of the invention.

What is claimed is:

1. An abnormality monitoring device for a vehicle control system, comprising:
   a plurality of control units of which objects to be controlled are different from one another;
   a multiplex communication line interconnecting said control units;
   transmitting means provided in one specific control unit within said vehicle control system, said transmitting means for inserting a count value indicative of the number of sending times, which is independent of control data, into communication data; and transmitting the resultant communication data; and
   judging means provided in an other control unit within said vehicle control system, said judging means for monitoring said count value of said communication data transmitted from said specific control unit, and judging that said specific control unit is abnormal, when said count value is not consecutively updated.

2. The abnormality monitoring device according to claim 1, wherein said other control unit comprises informing means for informing said control units that said specific control unit is abnormal.

3. The abnormality monitoring device according to claim 1, wherein a controller area network is used for the vehicle control system, and said communication data including said control data and said count value is stored in a data field of a data frame transmitted from said specific control unit to said other control unit.

4. An abnormality monitoring device for a vehicle control system, comprising:
   a plurality of control units of which objects to be controlled are different from one another; and
   a multiplex communication line interconnecting said control units;
   transmitting means provided in a first control unit within said vehicle control system, said transmitting means for inserting a count value indicative of the number of sending times, which is independent of control data, into communication data, and transmitting the resultant communication data to a second control unit within said vehicle control system; and
   judging means provided in a third control unit within said vehicle control system, said judging means for monitoring said count value of said communication data transmitted from said first control unit to said second control unit, and deciding that said first control is abnormal, when said count value is not consecutively updated.

5. The abnormality monitoring device according to claim 4, wherein said third control unit comprises informing means for informing said control units that said first control unit is abnormal.

6. The abnormality monitoring device according to claim 4, wherein a controller area network is used for the vehicle control system, and said communication data including said control data and said count value is stored in a data field of a data frame transmitted from said first control unit to said second control unit.

7. An abnormality monitoring device for a vehicle control system, comprising:
   a plurality of control units of which objects to be controlled are different from one another;
   a multiplex communication line interconnecting said control units;
   a transmitting unit provided in one specific control unit within said d vehicle control system, said transmitting unit inserting a count value indicative of the number of sending times, which is independent of vehicle control data, into communication data for vehicle control, and transmitting the resultant communication data; and
   a judging unit provided in an other control unit within said vehicle control system, said judging unit monitoring said count value of said communication data transmitted from said specific control unit, and judging that said specific control unit is abnormal, when said count value is not consecutively updated.

8. The abnormality monitoring device according to claim 7, wherein said other control unit comprises an informing unit informing said control units that said specific control unit is abnormal.

9. The abnormality monitoring device according to claim 7, wherein a controller area network is used for the vehicle control system, and said communication data including said vehicle control data and said count value is stored in a data field of a data frame transmitted from said specific control unit to said other control unit.

10. An abnormality monitoring device for a vehicle control system, the control system having
    a plurality of control units mounted on a vehicle for controlling functions of respective portions of said vehicle control system, and a multiplex communication line interconnecting with said control units for communicating various control data among said control units to drive said vehicle at an optimum condition, the abnormality monitoring device comprising:
    transmitting means provided in one of said control units for transmitting a count value of communication times irrespective of said control data by inserting said count value into said control data, and for producing a count value signal; and
    monitoring means responsive to said count value signal for judging an abnormality of an individual one of said control units when said count value is not continuously updated so as to detect said abnormality.

11. The abnormality monitoring device according to claim 10, wherein said vehicle control system further comprises informing means for informing said control units with information from said abnormality monitoring device that at least one of said control units is abnormal.

12. The abnormality monitoring device according to claim 10, wherein a controller area network is used for the vehicle control system, and said control data and said count value are stored in a data field of a data frame transmitted from at least one of said control units to said monitoring means.

* * * * *